(12) United States Patent
Miller et al.

(10) Patent No.: US 10,411,985 B1
(45) Date of Patent: Sep. 10, 2019

(54) NETWORK TRAFFIC MONITORING FOR VIRTUAL MACHINES

(71) Applicant: Amazon Technologies, Inc., Seattle, WA (US)

(72) Inventors: Kevin Christopher Miller, Fairfax, VA (US); Colm Gearóid MacCárthaigh, Seattle, WA (US); Joseph E. Magerramov, Bellevue, WA (US); Marcin Piotr Kowalski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 14/957,431

(22) Filed: Dec. 2, 2015

(51) Int. Cl.
*G06F 13/00* (2006.01)
*H04L 12/26* (2006.01)
*G06F 9/455* (2018.01)

(52) U.S. Cl.
CPC .......... *H04L 43/10* (2013.01); *G06F 9/45558* (2013.01); *H04L 43/06* (2013.01); *G06F 2009/45595* (2013.01)

(58) Field of Classification Search
CPC ...................... H04L 12/2602; H04L 12/2697; H04L 29/06; H04L 29/08072; H04L 41/22; H04L 43/00; H04L 43/50; H04L 43/06; H04L 43/10; H04Q 11/0478; G06F 9/45558; G06F 13/00; G06F 2009/45595
USPC .......................................... 370/250; 709/224
See application file for complete search history.

(56) References Cited

U.S. PATENT DOCUMENTS

2009/0290501 A1\* 11/2009 Levy ...................... H04L 49/70
370/250

\* cited by examiner

*Primary Examiner* — Robert B Harrell
(74) *Attorney, Agent, or Firm* — Davis Wright Tremaine LLP

(57) ABSTRACT

A physical host agent receives configuration information from a virtual computer system service specifying network traffic information to be extracted from network traffic for one or more virtual machines. The agent extracts the specified network traffic information from the network traffic for the one or more virtual machines and aggregates the network traffic information into one or more data segments for storage in a repository. A publishing sub-system of the service obtains the one or more data segments and compiles the one or more data segments into data logs for delivery to an analytics service to make the network traffic information available to customers.

20 Claims, 10 Drawing Sheets

NETWORK TRAFFIC MONITORING FOR VIRTUAL MACHINES

BACKGROUND

Computing resource service providers and other service providers often maintain and operate various physical hosts to support various computing resources, including virtual machines, on behalf of their customers. These service providers may enable customers to request monitoring of network traffic to and from their virtual machines to other physical hosts and computing systems through one or more networks. For example, a customer of a service provider can request monitoring of network traffic to troubleshoot any issues regarding the transmission or receipt of network traffic through a particular virtual machine. However, customers of these service providers may want to monitor network traffic to and from their virtual machines to identify additional features of this network traffic that may be important for these customers' business needs.

BRIEF DESCRIPTION OF THE DRAWINGS

Various embodiments in accordance with the present disclosure will be described with reference to the drawings, in which.

DETAILED DESCRIPTION

Figure 1:
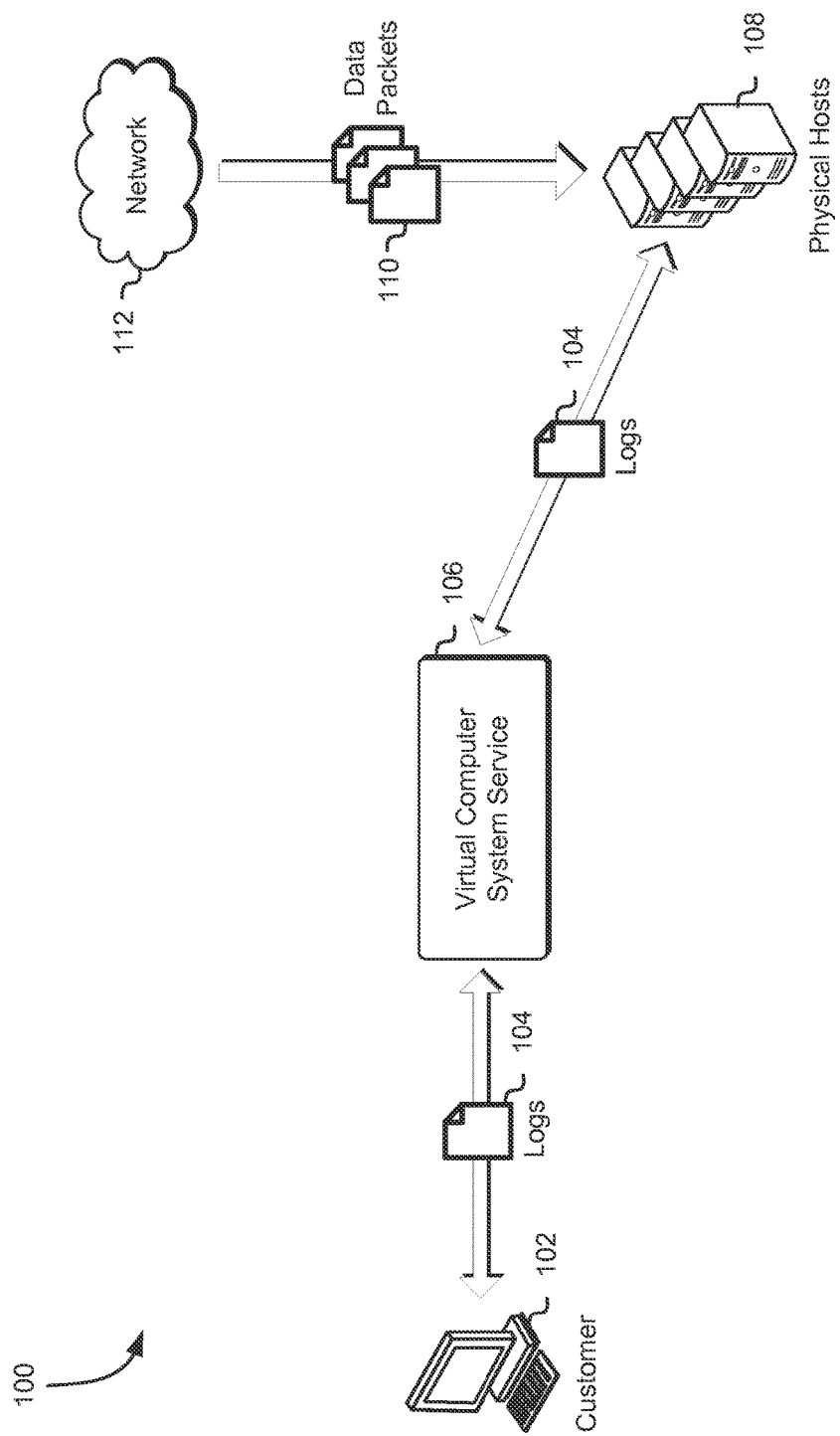
FIG. 1 shows an illustrative example of an environment in which various embodiments can be implemented.

This disclosure relates to the monitoring of network traffic to generate data logs that include information about network traffic transmitted and received by a customer's virtual machines through any number of networks. In one example, a virtual computer system service receives a request from a customer of a computing resource service provider to opt-in for collection of information from network traffic being received and transmitted by the customer's virtual machines instantiated onto various physical hosts maintained by the virtual computer system service. For instance, a customer may submit a request to evaluate any network traffic to determine whether any data packets are encrypted. Additionally, or alternatively, a customer may request monitoring of the network traffic to identify the operating system of any computer system transmitting data to the customer's virtual machines. The virtual computer system service may identify the parameters (e.g., encryption, operating system, data packet size, etc.) of the network traffic information that is to be collected. Further, the virtual computer system service may identify the physical hosts for the virtual machines selected by the customer for monitoring.

Based on the identified parameters, the virtual computer system service may transmit configuration information to agents operating within each of the identified physical hosts to monitor any incoming or outgoing network traffic for the customer's specified information. In an example, an agent of a physical host receives a data packet from a network and determines, based on the configuration information provided by the virtual computer system service, what information is to be extracted from the data packet. For instance, if the customer has requested operating system information from these data packets, the physical host agent may evaluate the data packets and, based on the features of the data packet, determine the operating system of the computing system that transmitted the data packet through the network. In other examples, the physical host agent evaluates various data packets having the same origin to generate a conclusion to a particular level of certainty as specified in the configuration information. Thus, the physical host agent may extract the specified information from the various data packets transmitted over the network and add the generated conclusion to a buffer for additional processing.

In an example, a hypervisor, through a user daemon, accesses the ring buffer to obtain the generated conclusion and data packet metadata extracted from the data packets. For instance, the user daemon may be configured to access the ring buffer at certain intervals to obtain any available information pertaining to the customer and its virtual machines. The user daemon may compile the information from the ring buffer collected over a particular period of time or for a particular time interval while filtering out any excess information that has not been requested by the customer. The user daemon may add the compiled data packet metadata and conclusion to a second buffer, which may be utilized by a data uploader of the hypervisor to store the data packet metadata and conclusion within a repository. Additionally, the data uploader may generate a notification to indicate that the newly compiled data packet metadata and conclusion is available within the repository. This notification may be added to an event queue, which may be used by a data publishing sub-system of the virtual computer system service to determine when new data packet metadata and conclusion is made available.

The data publishing sub-system may obtain the compiled data packet metadata and conclusion from the repository in response to processing the event from the queue and use this compiled data packet metadata and conclusion to generate a data log. The data log may specify the requested information for a specified period of time or for a particular time interval, identifiers for the physical hosts that collected the information, a customer identifier, and the like. The data publishing sub-system may transmit this data log to an analytics service where it may be stored within a data log repository. The analytics service or the virtual computer system service may transmit a notification to the customer that the newly created data log is available for the customer to review and analyze. This enables the customer to transmit a request to the analytics service to retrieve the newly created data log and utilize the data log for any purpose.

In this manner, a customer of a virtual computer system service may obtain network traffic information upon request to identify any characteristics of the network traffic to and from its virtual machines. In addition, the techniques described and suggested herein facilitate additional technical advantages. For instance, because the physical host agent is configured to only extract data packet metadata from the data packets usable to generate conclusions requested by the customer, the data logs generated by the physical host agents may only include the conclusions the customer has requested and the data packet metadata used to generate the conclusions, without any superfluous material. Thus, a customer may obtain, from the analytics service, a data log that only includes the requested conclusions and metadata. This may make it easier for the customer to process the received information for its own needs.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which various embodiments can be implemented. In the environment 100, a customer 102 (e.g., individual, organization, automated process, computing resource agent, etc.) of a computing resource service provider may transmit a request to a virtual computer system service 106 to monitor network traffic to and from the customer's virtual machines instantiated onto one or more physical hosts 108 to generate one or more conclusions about the network traffic according to a set of parameters defined by the customer 102. For instance, a customer 102 may request that the virtual computer system service 106 track the network traffic to and from the customer's virtual machines to determine whether any network traffic is encrypted. Additionally, or alternatively, the customer 102 may request that the virtual computer system service 106 determine the operating system of any computing system attempting to establish a network connection with the customer's virtual machines or that has successfully established a network connection with these virtual machines. While encryption and operating system tracking are used extensively throughout the present disclosure, it should be noted that a customer 102 of a computing resource service provider may request tracking of other metrics and characteristics of network traffic originating from or destined to the customer's virtual machines. The request to obtain specific data packet metadata may be provided in the form of an application programming interface (API) call to the virtual computer system service 106. The data packet metadata may include information from the payload of each data packet evaluated by the physical host agent.

In response to the request from the customer 102, the virtual computer system service 106 may identify the parameters of the data packet metadata that is to be collected on behalf of the customer 102. For instance, the virtual computer system service 106 may identify one or more properties of the network traffic protocols that may be used to determine whether the network traffic is encrypted. Alternatively, if the customer 102 has specified that it would like to monitor for the operating system of the computing systems connected to the customer's virtual machines, the virtual computer system service 106 may identify one or more parameters of the network traffic protocols that may be utilized to determine an operating system of the computing system generating the network traffic.

The virtual computer system service 106 may identify, based at least in part on the customer's request, which physical hosts 108 of a fleet of physical hosts have instantiated the virtual machines that are to be monitored to determine the one or more conclusions based at least in part on data packet metadata of data packets. For instance, the virtual computer system service 106 may access a mapping registry to obtain a mapping of virtual machines to the fleet of physical hosts to identify the one or more physical hosts 108 wherein the customer's virtual machines are instantiated. Each physical host may include various components that collectively may be used to maintain and support one or more resource allocation units and the virtual machines that may be operating using any number of these resource allocation units. For instance, the physical host may include one or more processors, memory (e.g., random-access memory (RAM), dynamic RAM (DRAM), synchronous DRAM (SDRAM), Rambus DRAM (RDRAM), etc.), one or more storage devices, one or more hypervisors, and any other components that may be used in the operation of the physical host. In addition to these components, the physical host may further include an agent that may be configured to evaluate incoming and outgoing network traffic to extract data packet metadata for tracking certain network traffic parameters and characteristics. For instance, the agent may evaluate any incoming and outgoing data packets 110 to extract metadata that can be used in fulfilling the customer's request for determining one or more conclusions regarding the network traffic for its virtual machines.

In an embodiment, the virtual computer system service 106 transmits configuration information to each physical host agent of the one or more physical hosts 108 wherein the customer's virtual machines are instantiated. The configuration information may specify the data packet metadata that is to be extracted from the incoming and outgoing network traffic for the customer's virtual machines and used to generate one or more conclusions that may be aggregated into one or more data logs 104. A physical host agent receiving this configuration information may monitor any incoming and outgoing network traffic of the customer's virtual machines instantiated on to the corresponding physical host to extract the metadata for determining the conclusions requested by the customer 102.

The physical host agent may be initialized and/or updated using machine learning techniques, such as supervised learning techniques. A machine learning algorithm may, at any time, utilize one or more sample vectors (e.g., Transfer Control Protocol (TCP) flags, randomized text fields, SSH protocol entries, other data packet metadata, etc.) to perform one or more simulations to determine whether the functions utilized by the physical host agent are producing correct and accurate results (e.g., conclusions) and/or to refine the one or more functions utilized by the physical host agent to produce correct and accurate results. For instance, during initialization of the machine learning algorithm, a service provider may provide the machine learning algorithm with one or more sample vectors and analytical results (e.g., desired outcomes) that should be obtained based at least in part on these one or more sample vectors. Accordingly, the machine learning algorithm, based at least in part on this exercise, may adjust the functions utilized by the physical host agent to analyze the incoming data packets 110 over one or more networks 112.

A computer system utilizing the machine learning algorithm may receive input from one or more analysts employed by the service provider to analyze the results from the one or more analyses performed by the physical host agent through use of the one or more functions described above. For instance, an analyst may review incoming data packets 110 for the physical host agent to determine conclusions for any customer query for network traffic information. The analyst may provide his/her input for use in refining a function used to classify vector input as corresponding to particular environments (e.g., encrypted or unencrypted, different types of operating systems, etc.). The vector of metadata corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. Accordingly, the machine learning algorithm may adjust the one or more functions used by the physical host agent to increase the likelihood that the desired result is obtained in future analyses.

The function used to classify measurement vectors may vary in accordance with various embodiments. For example, in some embodiments, support vector machine techniques are used to classify regions in Euclidean space as compliant or non-compliant so that measurements are classified in accordance with the region in which the measurement vectors fall. In yet another embodiment, the machine learning algorithm can utilize decision tree learning (e.g., using a random forest) to determine a decision (classification, regression) tree used to classify vector input as compliant or non-compliant. As a fictitious illustrative example, if a minimum requirement established by the service provider is that a minimum number of data packets must utilize Secure Shell (SSH) network protocol and utilize random text fields to be illustrative of encrypted data, the machine learning may result in a decision tree that, at least in part, bifurcates based on vector components indicating the network protocol used for the data packets and the characteristics of the text fields specified therein. Accordingly, if the input includes an indicator for the SSH network protocol and random text fields, the one or more functions (decision trees) would, in this example, be configured to provide a result that the environment is compliant with encrypted techniques. Thus, the machine learning algorithm may adjust the one or more functions if these one or more functions do not result in a conclusion indicating that the data packets are encrypted.

As the one or more physical hosts 108 receive a variety of data packets 110 over one or more networks 112, such as the Internet or a virtual private network (VPN), the physical host agent may evaluate each incoming or outgoing data packet 110 to extract data packet metadata that may be used to generate the requested conclusions from the data packet 110 and utilize one or more functions (e.g., algorithms) to classify the extracted metadata based at least in part on the customer's request. For instance, the physical host agent may utilize the one or more algorithms, with the extracted metadata as input, to determine whether the incoming data packets for a particular source (e.g., computing system attempting to establish a network connection with the virtual machine instance) are encrypted. The one or more algorithms may generate a conclusion, which may specify a classification for the extracted metadata (e.g., encrypted or not encrypted, operating system information, etc.). These conclusions, along with the metadata used to generate the conclusions, may be added to a ring buffer of the physical host hypervisor for further processing. The physical host agent may, for example, evaluate the data packet metadata to identify the network protocol being utilized, plain text or a random character strings, and/or any set flags associated with the network protocol (e.g., Transmission Control Protocol (TCP) flags, etc.), and the like to determine the requested information. For instance, if the data packet is being transmitted using the SSH network protocol, then the physical host agent may determine that the data packet includes encrypted data. Similarly, if the data packet includes random character strings that cannot be deemed to be plain text, this may also serve as an indication that the data packet is encrypted. This information, for each data packet 110, may be used to generate the conclusion. This conclusion, as well as the data packet metadata, may then be added to the ring buffer for use by a user daemon within the hypervisor of the physical host.

In some embodiments, the physical host agent will utilize the one or more functions to evaluate the TCP sequence numbers for any incoming data packets to determine if there is a retransmission of data through the network, a gap in the incoming data packets, missing data packets, and data packets arriving out of order. Further, the one or more functions may be configured to determine whether the TCP sequence numbers for data packets having a common originating computer system are outside of an acceptable range. The physical host agent may utilize this information to determine a conclusion indicative of a potential security issue. The data packet metadata generated by the physical host agent using this conclusion may be additionally transmitted to a security system or service for creation of one or more network alarms. In yet another embodiment, the physical host agent may utilize a state machine to evaluate the data packet metadata to identify a state for the computing device that is attempting to communicate with the virtual machine instance instantiated by the physical host. For instance, the state machine may evaluate the data packet metadata to identify the operating system of the computing device.

In an embodiment, the user daemon within the hypervisor obtains, from the ring buffer, data packet metadata collected by the physical host agent over a period of time. The user daemon may compile the data packet metadata from the ring buffer into one or more data segments based at least in part on the requested information collected (e.g., conclusions) and the time interval in which the data packet was collected. For instance, each data segment may correspond to a particular time interval based at least in part on when the data packet was evaluated by the physical host agent. The user daemon may add each of these newly created data segments in a second buffer, where they may be available to a data uploader of the hypervisor. This data uploader may store the data segments from the second buffer into a data logs repository. In some embodiments, the data uploader will also generate a notification to indicate that the data packet metadata and conclusions compiled into the one or more data segments is available for further processing by a data publishing sub-system of the virtual computer system service 106. For instance, the data uploader, through a notification service, may add the notification to an event queue that may be utilized by the data publishing sub-system to determine when new data segments are available for processing.

In response to a new notification being obtained from the queue by the data publishing sub-system, the virtual computer system service 106 may obtain the data segments from the data logs repository and generate one or more data logs 104 based at least in part on the requested information and the time interval during which the data packet metadata was recorded by the physical host agent for use in generating the one or more conclusions. These data logs 104 may be stored within the data logs repository and provided to the customer 102 in response to its request to obtain one or more conclusions regarding network traffic for its computing resources. In some embodiments, the virtual computer system service 106 will transmit the newly created data logs 104 to an analytics service, where the data logs 104 can be stored and made accessible to the customer 102 when so desired.

In an embodiment, the customer 102 of the computing resource service provider will receive a notification from the virtual computer system service 106 indicating that new data logs 104 are available for the customer's review at any time. Accordingly, the customer 102 can access the analytics service and submit a request to retrieve the one or more data logs 104 from the repository. For instance, the analytics service may identify, based at least in part on the request, the one or more data logs 104 corresponding to the customer's virtual machines from the repository and provide these one or more data logs 104 to the customer 102 to fulfill the request. As an illustrative example, the analytics service may obtain, from the request, a customer identifier that may be used to identify a user profile corresponding to the customer 102. This user profile may specify the various computing resources, including the customer's virtual machines, which are maintained by the computing resource service provider on behalf of the customer 102. The analytics service may utilize this information to identify the one or more data logs 104 stored within the repository corresponding to the customer's computing resources, including its virtual machines. The analytics service may provide these one or more data logs 104 to the customer 102, thus fulfilling the request to obtain these data logs 104.

Figure 2:
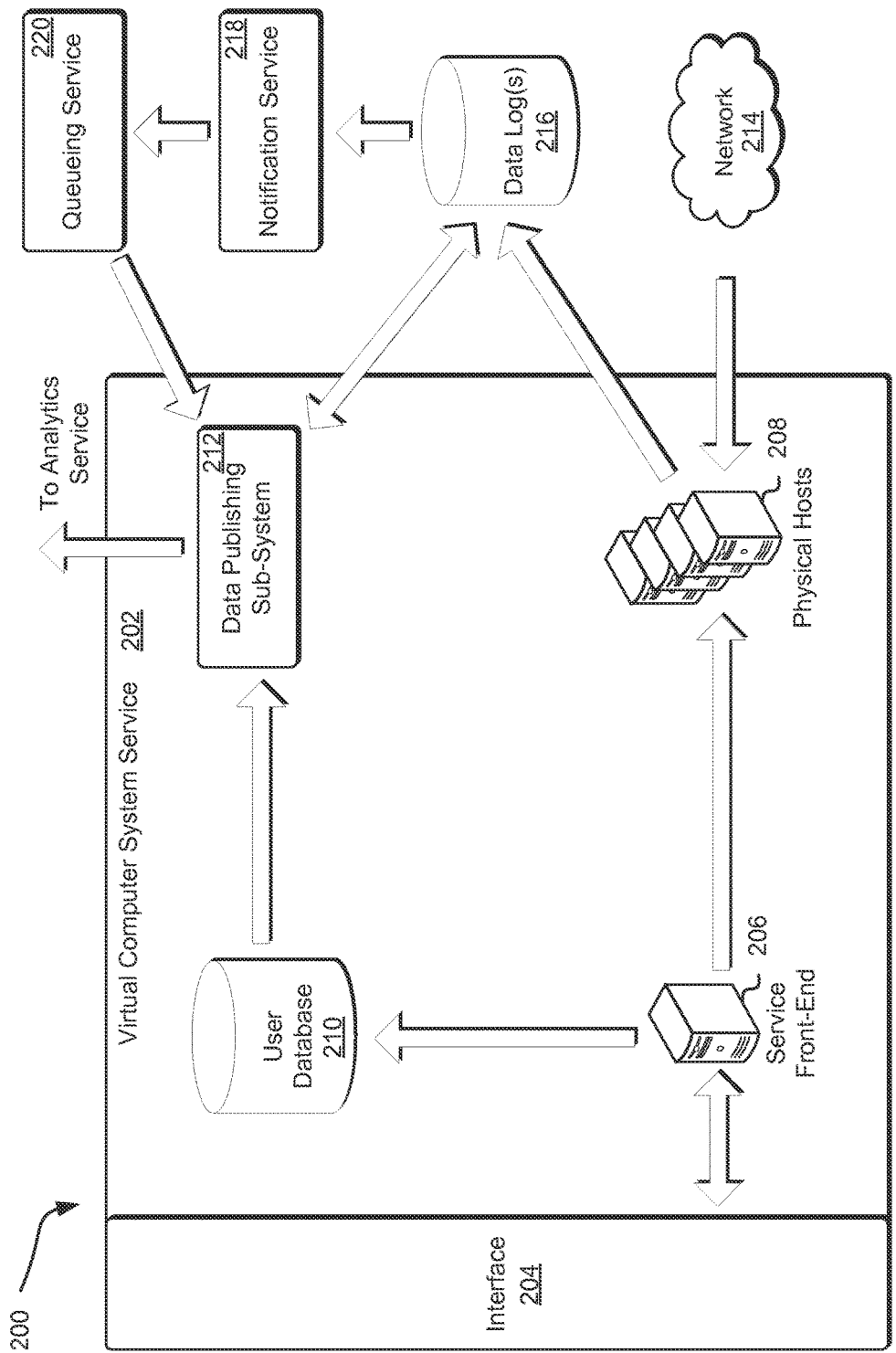
FIG. 2 shows an illustrative example of an environment in which a virtual computer system service processes requests for collection of data packet metadata for determining conclusions regarding network traffic and publishes data logs to an analytics service in response to the requests in accordance with at least one embodiment.

As noted above, the virtual computer system service may receive one or more requests from customers of the computing resource service provider to opt-in for determination of one or more conclusions based at least in part on network traffic for their particular computing resources (e.g., virtual machines, etc.). In response to these requests, the virtual computer system service may configure one or more physical host agents within any physical hosts wherein the customer's computing resources are maintained to evaluate data packet metadata for any incoming and outgoing network traffic to obtain the requested conclusions and make these conclusions and the metadata available through data logs provided to an analytics service. Accordingly, FIG. 2 shows an illustrative example of an environment 200 in which a virtual computer system service 202 processes requests for determining one or more conclusions regarding network traffic for one or more computing resources and publishes data logs to an analytics service in response to the requests in accordance with at least one embodiment.

In the environment 200, the virtual computer system service 202 may receive a request from a customer to opt-in for determination of one or more conclusions based at least in part on network traffic for one or more computing resources of the customer. The request may be received by a service front-end 206 through an interface 204 provided by the virtual computer system service 202 to its customers. From the interface 204, a customer may select the computing resources for which the network traffic is to be monitored to obtain data packet metadata that may be used to obtain the requested one or more conclusions and the types of conclusions that are to be obtained from this network traffic. The interface 204 may include a graphical user interface (GUI) which may be utilized by the customer to make the aforementioned selections. For instance, through the GUI, the virtual computer system service 202 may specify the customer's computing resources that may be monitored for the requested information. For example, the service front-end 206 may access a user database 210 and utilize a customer identifier to identify the customer's one or more computing resources maintained by the virtual computer system service 202. The service front-end 206 may utilize the information obtained from the user database 210 to populate the GUI and to enable the customer to select, through the GUI, the one or more computing resources that are to be monitored. In an alternative embodiment, the customer, through the interface 204, can transmit one or more API calls to the virtual computer system service 202 to monitor any number of the customer's computing resources. The API call may specify identifiers of these computing resources, as well as the types of information to be collected by the virtual computer system service 202.

The service front-end 206 may include one or more computer systems configured to process incoming customer requests received through the interface 204 and to transmit configuration information to the one or more physical hosts 208 for operating and maintaining computing resources on behalf of the customers of the computing resource service provider. In an embodiment, the service front-end 206 identifies, from the user database 210, the physical hosts 208 wherein the customer's specified computing resources are located. For instance, the service front-end 206 may utilize a customer identifier obtained through the request to identify the corresponding computing resources maintained on behalf of the customer. The user database 210 may specify, for each of these computing resources, a physical host 208 that is being utilized for the computing resource. For instance, if the computing resource is a virtual machine, the user database 210 may specify a physical host 208 used to instantiate the virtual machine on behalf of the customer.

In an embodiment, the service front-end 206 transmits configuration information to the identified one or more physical hosts 208 to extract data packet metadata and use this metadata as input into one or more algorithms to collect the requested conclusions on behalf of the customer. The configuration information may be processed by a physical host agent operating within each of the identified physical hosts 208, which may cause the physical host agent to evaluate incoming data packets and outgoing data packets for the identified computing resources through one or more communications networks 214. For instance, the physical host agent may process incoming and outgoing network traffic through a network stack module, such as an Internet Protocol (IP) table, to identify the originating and destination IP addresses and determine whether any of the identified IP addresses correspond to a computing resource being monitored. If so, the physical host agent may determine, based at least in part on the obtained configuration information, the metadata that is to be extracted from the incoming or outgoing data packets. This may cause the physical host agent to evaluate the data packets and extract the relevant metadata for use as input into one or more algorithms for determining one or more conclusions about the network traffic. These conclusions may be used for aggregation and production of one or more data logs, as will be described in greater detail below.

As the physical host agent obtains the requested conclusions based at least in part on the extracted metadata from the various data packets, the physical host agent may add these conclusions and the metadata to a ring buffer within the physical host 208. This ring buffer may be accessible by a user daemon of the physical host agent operating in the user-space of an initial domain created by the hypervisor of the physical host 208. The user daemon may compile any metadata and conclusions obtained from the ring buffer into one or more data segments. These data segments may be organized based at least in part on the particular metadata and conclusions collected by the physical host agent and on the time interval during which the particular metadata was collected. The user daemon may add these data segments to a second buffer (e.g., ring buffer, generic buffer, single-record buffer, etc.), which may be accessible to a data uploader configured to obtain the data segments from the second buffer and upload these data segments to a data logs repository 216.

The data logs repository 216 may include one or more storage devices and/or servers configured to store data segments that are to be aggregated and published to an analytics service. In an embodiment, the data logs repository 216 includes one or more computer systems configured to generate a notification in response to receiving one or more data segments from a data uploader of a physical host 208. The notification may specify the location of the one or more data segments within the storage devices of the data logs repository 216, the type of information specified within the one or more data segments, and the time interval during which the metadata was collected by the physical host agents. The notification may be provided to a notification service 218, which may be a collection of computing resources configured to enable customers to send and receive notifications through a communications network. A customer may utilize an interface, provided by the computing resource service provider, to create or subscribe to one or more subjects to which one or more messages may be published through. For instance, a customer may use the interface to create a new subject and subscribe to this subject by specifying that any messages published to the subject may be transmitted to a particular location (e.g., electronic mail address, one or more servers, an existing queue within the managed queuing service, etc.). Accordingly, when a customer publishes a message to the subject, the message may be transmitted to each recipient subscribed to the subject.

In an embodiment, the notification is published to a particular subject such that the notification is transmitted by the notification service 218 to a managed queuing service 220, which may generate an event based at least in part on the received notification. The managed queuing service 220 may be a collection of computing resources configured to enable customers to store one or more messages in queues for use by one or more services provided by the computing resource service provider. Each message that is stored in a queue may comprise one or more API calls which, when processed by a recipient service, may cause the service to perform one or more actions. Alternatively, each message may comprise any variation of text, such as programming code, URLs for data objects and other statements.

The virtual computer system service 202 may include a data publishing sub-system 212 that may include one or more computer systems or modules of computer systems of the virtual computer system service 202 that may be configured to access the managed queuing service 220 to identify any new events generated by the managed queuing service 220. The data publishing sub-system 212 may obtain the event from the managed queuing service 220 and determine whether this event specifies new metadata and corresponding conclusions that may be stored within the data logs repository 216. If so, the data publishing sub-system 220 may evaluate the included notification to determine where within the data logs repository 216 the newly created data segments are stored and transmit a request to the data logs repository 216 to obtain these data segments.

In an embodiment, the data publishing sub-system 212 obtains the one or more data segments from the data logs repository 216 and utilizes these one or more data segments to generate one or more data logs that may be processed by an analytics service of the computing resource service provider. The data logs may have a distinct format that may be used by the analytics service to identify the customer for whom the conclusions and metadata was collected, the corresponding computing resource for which the conclusions and metadata was collected, the types of metadata and conclusions collected, the time intervals during which the metadata was collected, and the like. Further, the format of the data logs may enable customers of the computing resource service provider to review the collected information for its particular needs. The data publishing sub-system 212 may publish the data logs to the analytics service, which may catalog and store the data logs in a published data logs repository. Further, the analytics service may update a user profile for the customer to indicate the storage location of the data logs within the repository. Thus, if a customer submits a request to the analytics service to obtain data logs corresponding to its computing resources, the analytics service may evaluate the customer's user profile to identify the location of these data logs and provide the data logs to the customer to fulfill its request.

Figure 3:
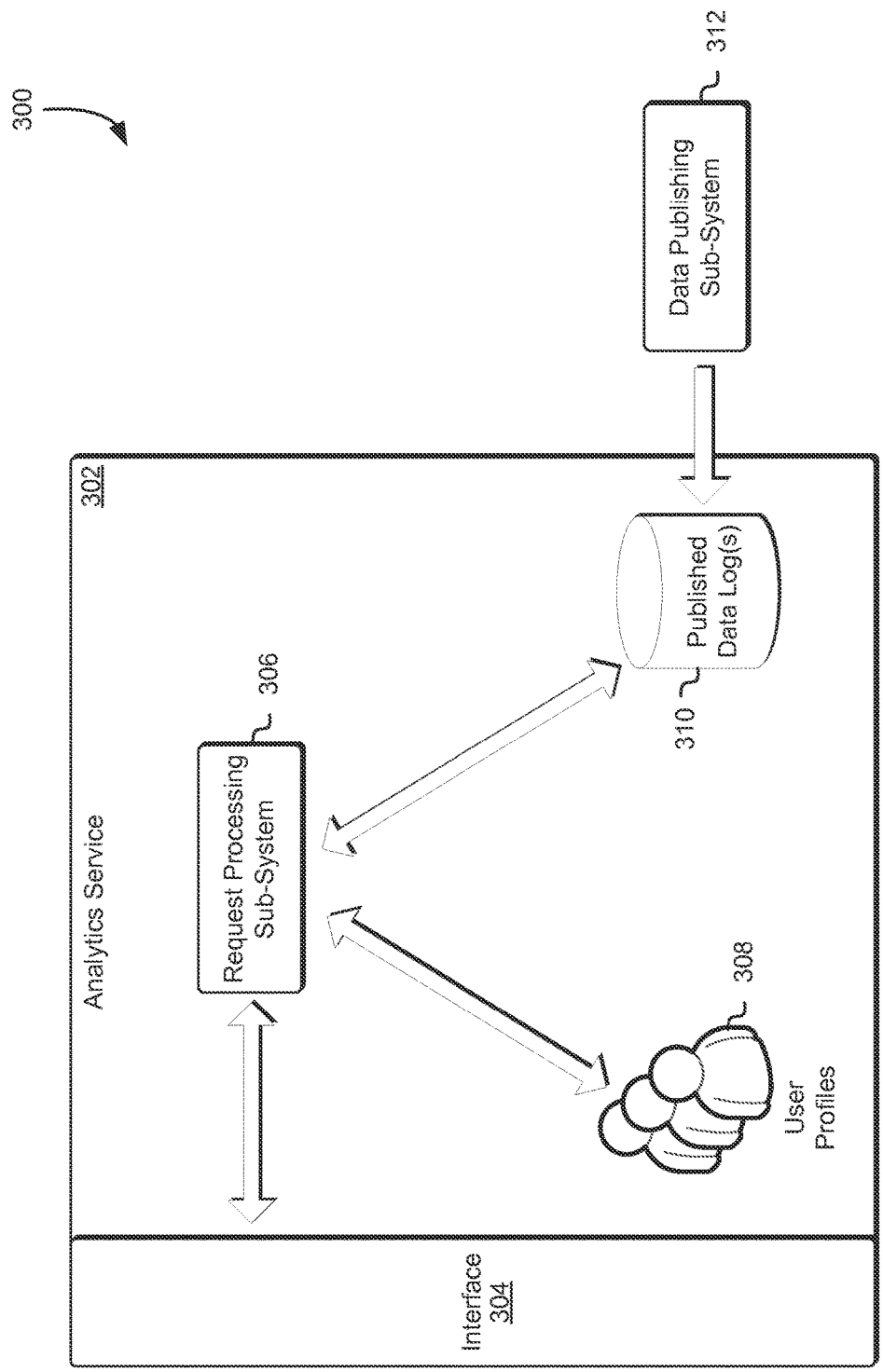
FIG. 3 shows an illustrative example of an environment in which an analytics service obtains one or more published data logs from a data publishing sub-system and makes these data logs available to customers of the service upon request in accordance with at least one embodiment.

As noted above, the data publishing sub-system of the virtual computer system service may transmit any newly created data logs specifying a customer's requested conclusions regarding network traffic for its computing resources to an analytics service. The data logs may be stored within a published data logs repository where these data logs may be accessible to the customer upon request. Further, the analytics service may provide additional tools, such as visualization tools, to the customer to access and visualize the information specified within these data logs. Accordingly, FIG. 3 shows an illustrative example of an environment 300 in which an analytics service 302 obtains one or more published data logs from a data publishing sub-system 312 and makes these data logs available to customers of the service upon request in accordance with at least one embodiment.

In the environment 300, the analytics service 302 may provide users with an interface 304, which the customers may interact with in order to request any data logs that may correspond to data (e.g., network traffic information) associated with the customer's computing resources. For instance, through the interface 304, a customer may submit one or more queries for data associated with the customer's computing resources. When the customer first accesses the interface 304, the interface 304 may obtain from the user a set of credentials that may be used to identify any computing resources allocated to the customer. For example, the interface 304 may provide this set of credentials to a request processing sub-system 306, which is configured to access a user profile data store 308 and, based on a user profile corresponding to the set of credentials provided by the customer, identify any computing resources allocated to the customer. Based at least in part on this information obtained from the user profile data store 308, the request processing sub-system 306 may update the interface 304 to provide the customer with identifiers for each of its computing resources for which data logs are available. This may enable the customer to utilize the interface 304 to query for any available data logs for any of the identified computing resources.

In response to a customer query to obtain one or more data logs for its computing resources, the request processing sub-system 306 may access the published data logs repository 310 to determine where within the repository the requested data logs are stored and to obtain these data logs on behalf of the customer. The published data logs repository 310 may include one or more storage devices (e.g., servers, hard drives, etc.) and at least one computer system configured to track where the data logs are stored within the one or more storage devices through use of an index. This index may specify the location of particular data logs within these one or more storage devices. Thus, when the request processing sub-system 306 accesses the published data logs repository 310 to obtain the requested data logs, the request processing sub-system 306 may obtain this index and determine which storage devices of the repository include the requested data logs.

In an embodiment, the published data logs repository 310 receives one or more data logs from a data publishing sub-system 312 of the virtual computer system service. As noted above, the data publishing sub-system 312 may obtain one or more data segments from a data logs repository and aggregate or otherwise convert these one or more data segments into the one or more data logs that are transmitted to the published data logs repository 310. As the published data logs repository 310 obtains the one or more data logs from the data publishing sub-system 312, the published data logs repository 310 may evaluate the incoming data logs to determine the characteristics of the data logs (e.g., customer identifiers, computing resource identifiers, type of information recorded, time interval for the information recorded, etc.). The published data logs repository 310 may provide this information to the request processing sub-system 306 in a request to update the corresponding user profiles of the identified customers associated with these data logs. This may cause the request processing sub-system 306 to access the user profile data store 308 to update any user profiles associated with the identified customers to indicate where, within the published data logs repository 310, these newly received data logs are stored.

Figure 4:
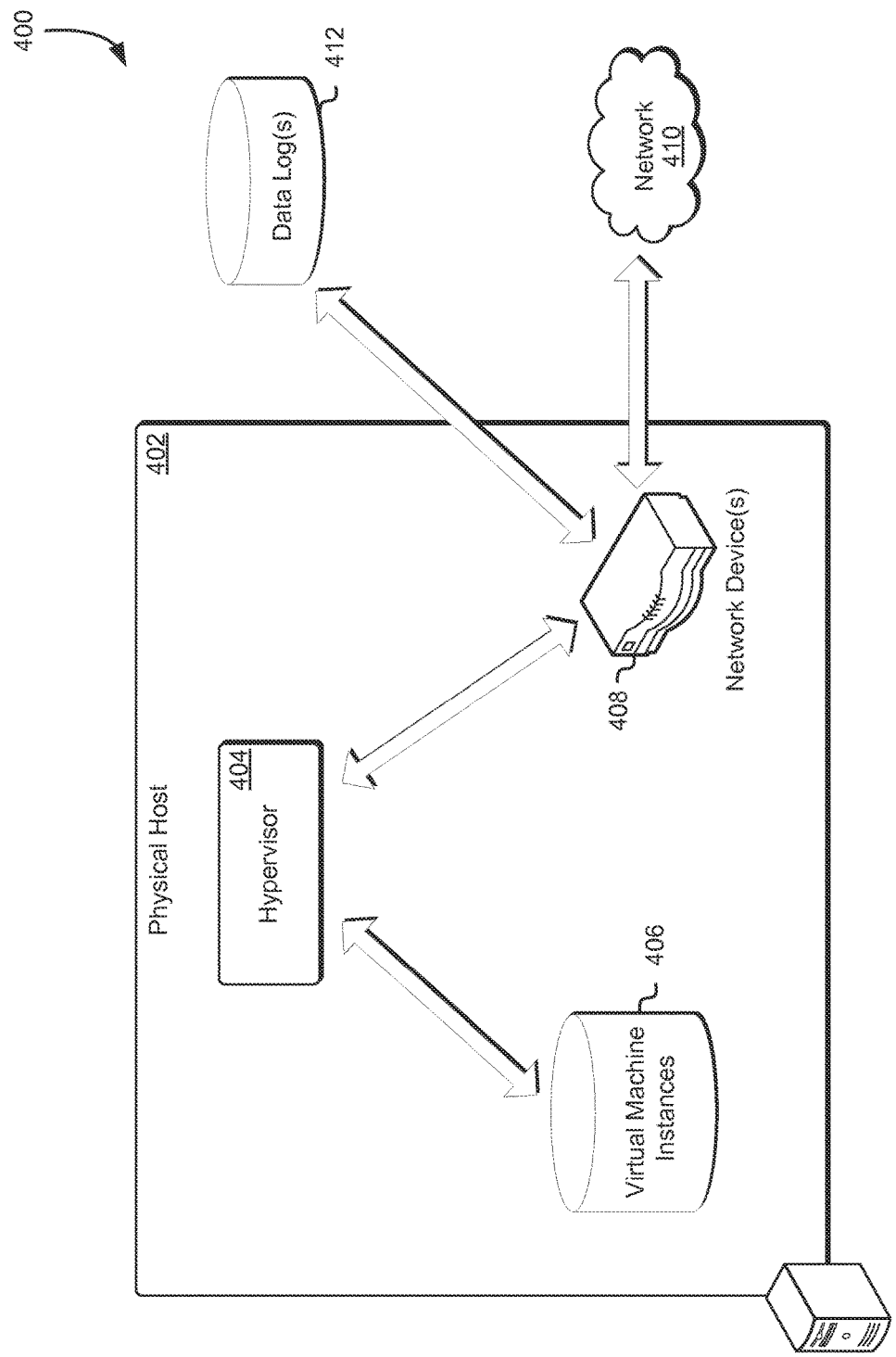
FIG. 4 shows an illustrative example of an environment in which a physical host receives one or more data packets and extracts information for creation of one or more data logs in accordance with at least one embodiment.

As noted above, a physical host may include a physical host agent configured to monitor incoming and outgoing network traffic for various virtual machine instances and collect metadata from one or more data packets to calculate one or more conclusions about the network traffic on behalf of customers of the virtual computer system service that may be aggregated into one or more data logs. Accordingly, FIG. 4 shows an illustrative example of an environment 400 in which a physical host receives one or more data packets and extracts metadata from the data packets to determine one or more conclusions regarding network traffic for creation of one or more data logs in accordance with at least one embodiment. In the environment 400, a physical host 402 may include various storage devices for instantiation of virtual machine instances 406 on behalf of one or more customers of the computing resource service provider. The physical host 402 may further include one or more processors, memory (e.g., random-access memory (RAM), dynamic RAM (DRAM), synchronous DRAM (SDRAM), Rambus DRAM (RDRAM), etc.), one or more hypervisors 404, one or more network devices 408 (e.g., modems, routers, network switches, etc.) and any other components that may be used in the operation of the physical host 402.

In an embodiment, the hypervisor 404 receives incoming and outgoing network traffic from the one or more network devices 408 and the virtual machine instances 406, respectively. The physical host 402 may include, within a kernel-space of an initial domain created by the hypervisor 404, a physical host agent configured to analyze the incoming and outgoing network traffic from the virtual machine instances 406 and the one or more network devices 408 to extract data packet metadata that may be used as input for one or more algorithms to calculate one or more conclusions regarding the network traffic as requested by the customers of the computing resource service provider. For instance, in response to a customer request to opt-in for determination of one or more conclusions regarding the network traffic for its virtual machine instances, the virtual computer system service may transmit configuration information to the physical host agent. This may cause the physical host agent to monitor any incoming or outgoing network traffic corresponding to the customer's virtual machine instances to extract data packet metadata. For example, as network traffic is received by the network devices 408 through one or more communications networks 410 (e.g., the Internet, etc.), the physical host agent operating through the hypervisor 404 may extract the metadata from incoming data packets received through the one or more communications networks 410 and utilize this metadata as input into one or more algorithms to determine one or more conclusions regarding the network traffic for the customer's virtual machine instances.

The physical host agent may place the determined one or more conclusions and the extracted metadata within a ring buffer in the kernel-space, which may be accessed by a user daemon operating in the user-space of the initial domain for compilation into one or more data segments. A data uploader operating within the user-space may transmit the one or more data segments to the data logs repository 412 through the one or more network devices 408. Further, the data uploader may generate a notification through a notifications service to indicate that the newly created data segments are available within the data logs repository 412. This may enable a data publishing sub-system of the virtual computer system service to obtain the notification, access the data logs repository 412, and obtain the one or more data segments for aggregation and conversion into the one or more data logs that are provided to the analytics service.

Figure 5:
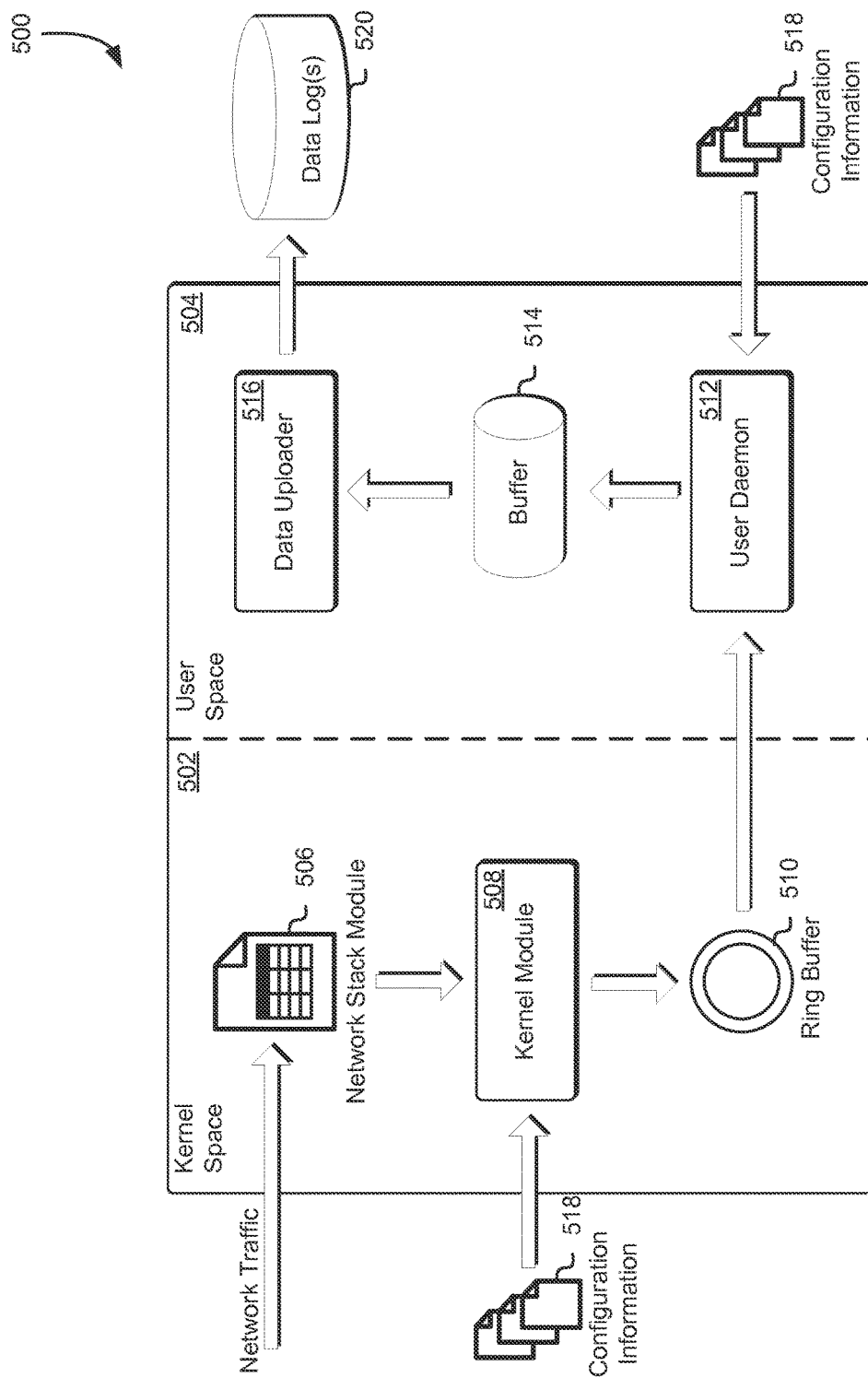
FIG. 5 shows an illustrative example of an environment in which network traffic is processed within a kernel space of a physical host to extract data packet metadata that is further processed within a user space for creation of one or more data logs in accordance with at least one embodiment.

As noted above, each physical host may have an initial domain initiated by a hypervisor that may be utilized to operate one or more applications or modules for evaluating network traffic and extracting network traffic information on behalf of one or more customers of the computing resource service provider. Accordingly, FIG. 5 shows an illustrative example of an environment 500 in which network traffic is processed within a kernel-space 502 of a physical host to extract data packet metadata that is further processed within a user-space 504 for creation of one or more data logs in accordance with at least one embodiment. In the environment 500, network traffic may flow through the kernel-space 502 of the initial domain where each data packet is evaluated against a network stack module 506. The network stack module 506 may be an application operating within the kernel-space 502 of the physical host or a driver that includes a set of processing rules for any incoming data packets from the network. Examples of network stack modules 506 include: iptables, ip6tables, arptables, ebtables, etc. The network stack module 506 may specify originating and destination IP addresses for computing systems, including IP addresses for the various virtual machines operating using resources of the physical host. Further, the network stack module 506 may specify one or more rules for the handling of these data packets. For instance, the network stack module 506 may specify whether data packets having specific destination and origination IP addresses are to be processed or discarded (e.g., trusted IP addresses, etc.).

Data packets may be further processed through a kernel module 508 operating within the kernel-space 502. The kernel module 508 may operate as the physical host agent described above. For instance, the kernel module 508 may obtain configuration information 518 from the service frontend of the virtual computer system service that specifies the data packet metadata to be extracted from the various data packets originating from or destined to a customer's particular virtual machine instances. For instance, the configuration information 518 may include a customer identifier, identifiers for the customer's virtual machine instances, IP addresses corresponding to the customer's virtual machine instances, the type of data packet metadata to be obtained, and any programming instructions for identifying the data packet metadata that is to be extracted from the data packets. The configuration information 518 may cause the kernel module 508 to identify the data packet metadata from the various data packets originating from or destined to a customer's virtual machine instances.

In an embodiment, the kernel module 508 is further configured to utilize the extracted data packet metadata as input for one or more algorithms for determining one or more conclusions regarding the incoming network traffic. For instance, if a customer has requested conclusions as to whether the incoming network traffic is encrypted, the kernel module 508 may identify one or more algorithms for determining the presence of encryption in the incoming data packets. The kernel module 508 may utilize the extracted metadata as input into these one or more algorithms, which may produce a conclusions specifying if the data packets from which the metadata was extracted are encrypted. In some instances, the one or more algorithms may be used to make a determination as to a level of certainty regarding encryption or other information requested by the customer. The kernel module 508 may place these conclusions, as well as the extracted metadata, within a ring buffer 510 for further processing.

Within the user-space 504 of the initial domain, a user daemon 512 may obtain configuration information 518 from the service front-end to determine what metadata and corresponding conclusions are to be obtained from the ring buffer 510. The user daemon 512, based at least in part on the received configuration information 518, may obtain the metadata and corresponding conclusions stored in the ring buffer 510 and compile this information into one or more data segments. The compilation of the metadata and corresponding conclusions may be based at least in part on the type of conclusions determined by the kernel module 508 (e.g., operating system, encryption, protocol, etc.) as well as the time interval during which the metadata was extracted from the data packets by the kernel module 508. The user daemon 512 may store the one or more data segments created using the metadata and corresponding conclusions from the ring buffer 510 into a second buffer 514 within the user-space 504.

The user-space 504 of the initial domain may further include a data uploader module 516 configured to obtain the one or more data segments stored within the second buffer 514 and upload these data segments to the data logs repository 520. Additionally, the data uploader module 516 may generate a notification to indicate that the one or more data segments stored within the data logs repository 520 are available for aggregation and conversion into one or more data logs that may be uploaded to an analytics service. The data uploader module 516 may transmit this notification to a notifications service, which may enable a data publishing sub-system of the virtual computer system service to obtain the notification, access the data logs repository 520, and obtain the one or more data segments.

Figure 6:
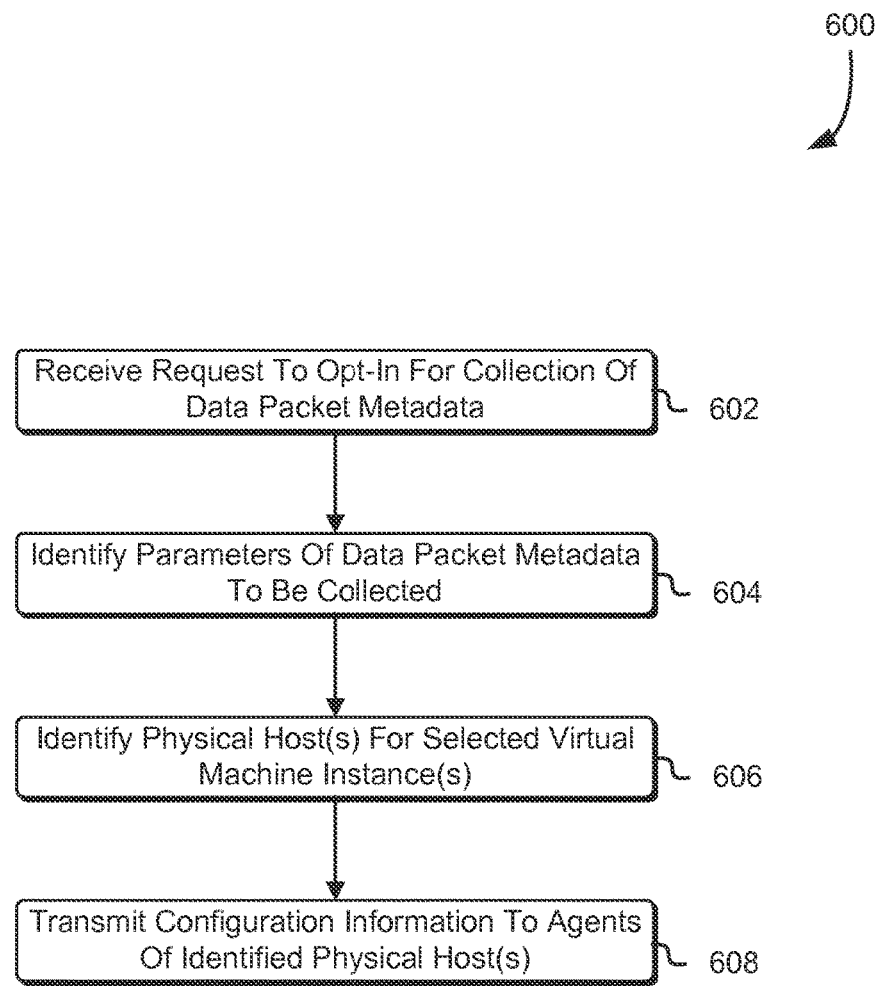
FIG. 6 shows an illustrative example of a process for transmitting configuration information to physical host agents in response to a request to opt-in for determining one or more conclusions regarding network traffic in accordance with at least one embodiment.

As noted above, a customer may transmit a request to a virtual computer system service to opt-in for monitoring of its virtual machines to obtain particular network traffic information. This may cause the virtual computer system service to transmit configuration information to physical host agents (e.g., kernel modules) of the physical hosts wherein the customer's virtual machines are operating to enable these physical host agents to extract data packet metadata from the incoming and outgoing network traffic for the customer's virtual machines and to utilize the metadata to determine one or more conclusions about the network traffic for the customer's virtual machines. Accordingly, FIG. 6 shows an illustrative example of a process 600 for transmitting configuration information to physical host agents in response to a request to opt-in for determining one or more conclusions regarding network traffic in accordance with at least one embodiment. The process 600 may be performed by the aforementioned virtual computer system service, which may process incoming requests from one or more customers of the virtual computer system service and transmit configuration information to one or more physical hosts based at least in part on the received request.

At any time, the virtual computer system service may receive 602 a request from a customer to opt-in for determining one or more conclusions regarding network traffic based at least in part on data packet metadata extracted from incoming and outgoing data packets. The request may be received by the virtual computer system service through an interface provided by the virtual computer system service to its customers. From the interface, a customer may select the computing resources for which the network traffic (e.g., data packets) is to be monitored to obtain the data packet metadata and the types of conclusions that are to be determined based at least in part on this network traffic. The data packet metadata may include a portion of each data packet payload and/or metadata of each data packet being analyzed by the physical host agent. The interface may include a GUI which may be utilized by the customer to make the aforementioned selections. The virtual computer system service may access a user database and utilize a customer identifier to identify the customer's one or more virtual machine instances maintained by the virtual computer system service. This information may be used to populate the GUI and to enable the customer to select, through the GUI, the one or more virtual machine instances that are to be monitored. Alternatively, a customer can transmit one or more API calls to the virtual computer system service to monitor any number of the customer's computing resources.

In response to the request from the customer, the virtual computer system service may identify 604 the parameters of the data packet metadata that is to be extracted by the physical host agents and used as input to one or more algorithms for determining the requested conclusions regarding the network traffic. For instance, based at least in part on the requested data packet metadata that is to be extracted to determine the one or more conclusions, the virtual computer system service may determine what properties of incoming data packets are to be evaluated to determine the data packet metadata that is to be extracted. As an illustrative example, if the customer has specified that it wants to determine whether any network traffic for its virtual machine instances is encrypted, the virtual computer system service may determine that the physical host agent is to extract metadata that may specify the network protocol being utilized for each data packet to identify any data packets formatted using the SSH protocol. Additionally, the virtual computer system service may determine that the physical host agent is to extract metadata from the data packets that include random text fields that may be indicative of encrypted data. This metadata may be utilized as input for one or more algorithms that may be used to determine, with a level of certainty, whether the data packets are encrypted.

The virtual computer system service may further identify 606 the one or more physical hosts that have instantiated within the one or more virtual machine instances selected by the customer. For instance, the virtual computer system service may access a user database to obtain a mapping of virtual machine instances to physical hosts maintained by the virtual computer system service. This mapping may specify, for each virtual machine instance, an identifier corresponding to a physical host where the virtual machine instance is instantiated. The virtual computer system service may utilize the identifiers corresponding to the selected virtual machine instances and identify the corresponding physical hosts from this mapping.

Based at least in part on the identification of the one or more physical hosts, the virtual computer system service may transmit 608 configuration information to physical host agents of these identified physical hosts. The configuration information may specify the metadata to be extracted from any incoming or outgoing data packets, as well as programming instructions that may cause the physical host agent to evaluate the metadata from the data packets to determine the one or more conclusions regarding the network traffic for the particular resources. The configuration information may include the one or more algorithms that are to be used to determine the one or more conclusions regarding the network traffic, as well as programming instructions for using these one or more algorithms. Thus, the physical host agents may utilize the configuration information to initiate monitoring of network traffic for the customer's virtual machine instances, extract the metadata from this network traffic, and utilize one or more algorithms to calculate the one or more conclusions regarding the network traffic to fulfill the customer's request.

Figure 7:
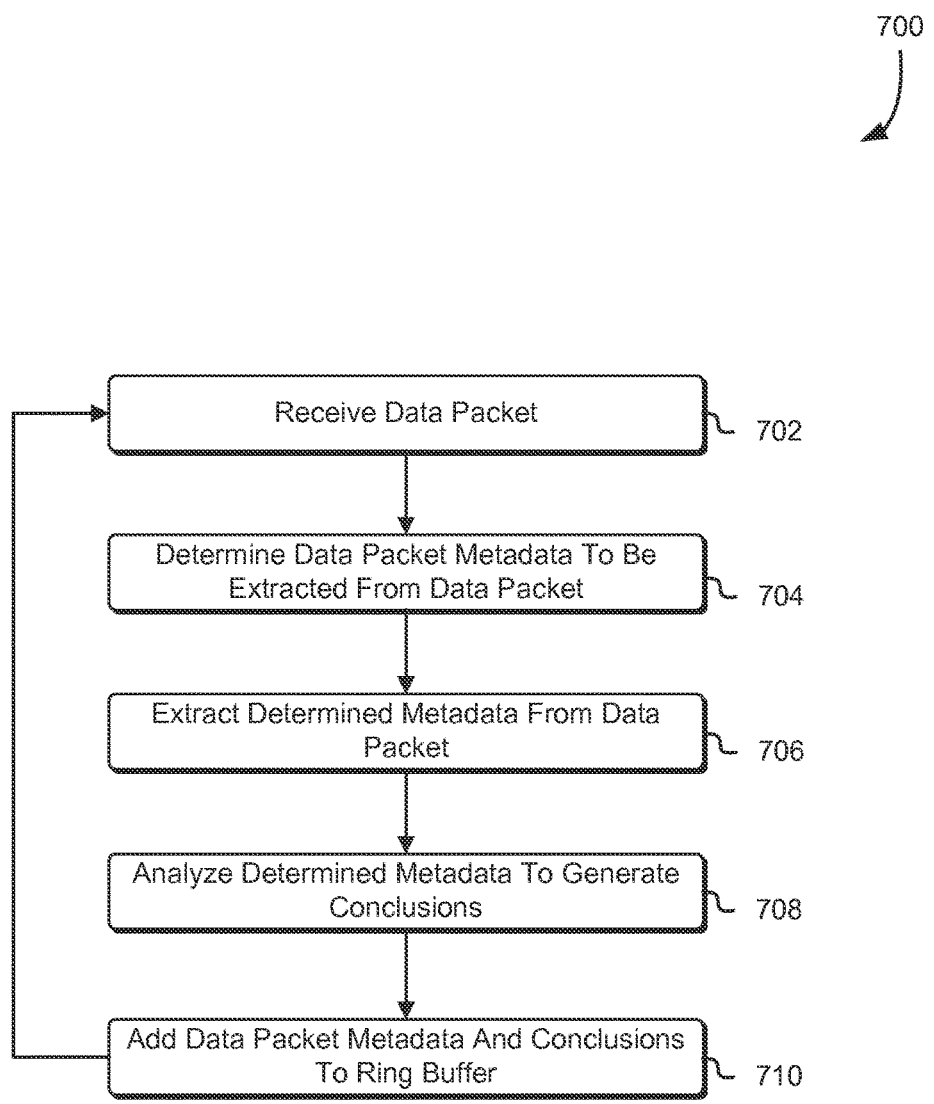
FIG. 7 shows an illustrative example of a process for processing one or more data packets to extract data packet metadata for determining one or more network traffic conclusions for placement in a ring buffer to be used for creating data logs in accordance with at least one embodiment.

As noted above, the physical host agent of a physical host may be configured to evaluate incoming and outgoing data packets for one or more virtual machine instances to extract data packet metadata and utilize the metadata as input to one or more algorithms to generate one or more conclusions regarding the network traffic for these virtual machine instances as requested by one or more customers of a computing resource service provider. Accordingly, FIG. 7 shows an illustrative example of a process 700 for processing one or more data packets to extract data packet metadata for determining one or more network traffic conclusions for placement in a ring buffer to be used for creating data logs in accordance with at least one embodiment. The process 700 may be performed by the aforementioned physical host agent, which may be operating within a kernel module in the kernel-space of an initial domain created by a hypervisor of the physical host.

The physical host agent of the physical host may receive 702 a data packet from a virtual machine instance and destined for another computing system or from another computing system, through a network, destined for the virtual machine instance. As described above, the physical host agent may be provided with configuration information specifying programming instructions for monitoring of network traffic for one or more virtual machine instances. This configuration information may further specify what metadata is to be extracted from the data packets evaluated by the physical host agent on behalf of a customer of the computing resource service provider for its virtual machine instances. Thus, based at least in part on this configuration information, the physical host agent may determine 704 the data packet metadata that is to be extracted from the received data packet.

Using the configuration information obtained from the virtual computer system service, the physical host agent may extract 706 the determined metadata from the data packet. For instance, if the configuration information specifies that the physical host agent is to identify whether a data packet is encrypted, the physical host agent may evaluate the data packet to extract information usable to identify the network protocol being utilized. Similarly, if the physical host agent is configured to determine the operating system of a computing system attempting to communicate with a customer's virtual machine instance, the physical host agent may evaluate the received data packet to extract any metadata specifying indicators that may be used to determine the operating system of the computing system attempting to communicate with the customer's virtual machine instance.

In an embodiment, the physical host agent analyzes 708 the determined information from the received data packet to generate the data packet metadata. The physical host agent may utilize one or more algorithms to classify the extracted information based at least in part on the customer's request. For instance, the physical host agent may utilize the one or more algorithms, with the extracted information as input, to determine whether the incoming data packets for a particular source (e.g., computing system attempting to establish a network connection with the virtual machine instance) are encrypted. The one or more algorithms may generate a conclusion, which may specify a classification for the extracted information (e.g., encrypted or not encrypted, operating system information, etc.). These conclusions may be used to generate data packet metadata for the incoming data packets.

The physical host agent may take the conclusions generated based at least in part on the output of the one or more algorithms and the data packet metadata and add 710 this data packet metadata and the corresponding conclusions to a ring buffer within the kernel-space of the initial domain. This ring buffer may be accessible to one or more user daemons operating within the user-space of the initial domain configured to aggregate the data packet metadata and corresponding conclusions for the virtual machine instances and provide this metadata and conclusions to the data publishing sub-system of the virtual computer system service. As the user daemons obtain the data packet metadata and the corresponding conclusions from the ring buffer, the physical host agent may continue to receive new data packets, extract the determined metadata from these data packets, and utilize the one or more algorithms to generate new conclusions for further aggregation of the requested data packet metadata and corresponding conclusions.

Figure 8:
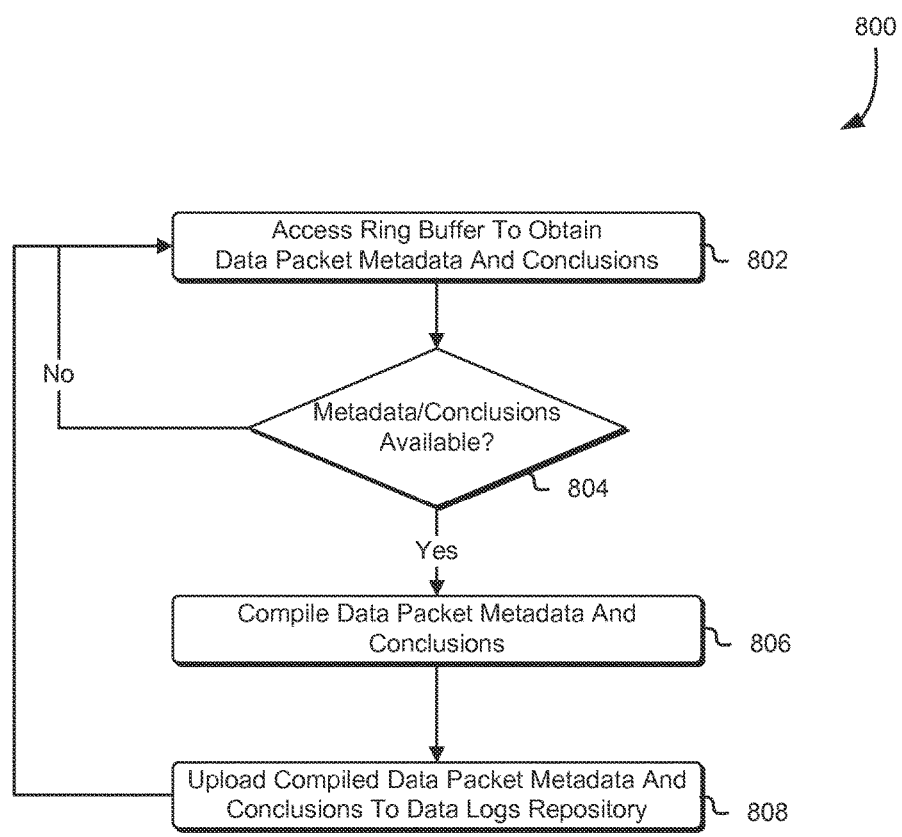
FIG. 8 shows an illustrative example of a process for obtaining data packet metadata and conclusions from a ring buffer to generate one or more data segments to be published to an analytics service in accordance with at least one embodiment.

As noted above, the user-space of the initial domain created by the hypervisor of a physical host may include a user daemon that may be configured to obtain data packet metadata and corresponding conclusions from the ring buffer in the kernel-space of the domain and compile this information into one or more data segments. The user-space may further include a data uploader module configured to upload these data segments to a repository, where the data segments may be available to a data publishing sub-system of the virtual computer system service for aggregation and conversion into data logs that may be provided to an analytics service. Accordingly, FIG. 8 shows an illustrative example of a process 800 for obtaining data packet metadata and corresponding conclusions from a ring buffer to generate one or more data segments to be published to an analytics service in accordance with at least one embodiment. The process 800 may be performed by the user daemon and the data uploader module operating in the user-space of the initial domain.

In an embodiment, the user daemon receives configuration information from the service front-end of the virtual computer system service that specifies what data packet metadata and corresponding conclusions are to be obtained from the ring buffer. For instance, the configuration information may specify a customer identifier, a virtual machine instance identifier, the type of data packet metadata that is to be obtained, the type of conclusions that are to be obtained, and the like. The user daemon may access 802 the ring buffer in the kernel-space of the initial domain and determine 804 whether there are any data packet metadata and conclusions stored in the ring buffer corresponding to the configuration information obtained by the user daemon. If the ring buffer does not include any data packet metadata or conclusions corresponding to the configuration information provided to the user daemon, the user daemon may continue to access the ring buffer until data packet metadata or corresponding conclusions become available for processing.

The user daemon may obtain any available data packet metadata and corresponding conclusions from the ring buffer and compile 806 this information into one or more data segments. These one or more data segments may correspond to particular data packet metadata and conclusions (e.g., encryption, operating system, protocols, etc.) and to particular time intervals. For instance, the user daemon may be configured to generate data segments each corresponding to a specific time interval (e.g., one minute segments, ten minute segments, hourly segments, daily segments, etc.) for each type of data packet metadata collected from the ring buffer. The user daemon may store these one or more data segments within a second buffer in the user-space of the initial domain where the data segments may be accessible to the data uploader module.

The data uploader module may access the second buffer to determine whether there are any data segments that are to be stored within the data logs repository. If so, the data uploader module may obtain the one or more data segments from the second buffer and upload 808 the data segments to the data logs repository, where the data segments may be accessible to the data publishing sub-system of the virtual computer system service. Additionally, in some embodiments, the data uploader module may generate a notification indicating that the uploaded one or more data packets are available within the data logs repository. For instance, the data uploader module may communicate with a notifications service to generate this notification. The notification may be transmitted to one or more subscribers to the subject corresponding to the notification, including a particular queue of a managed queuing service. This queue may be utilized by the data publishing sub-system to identify any new notifications indicating the presence of newly created data segments within the data logs repository.

Figure 9:
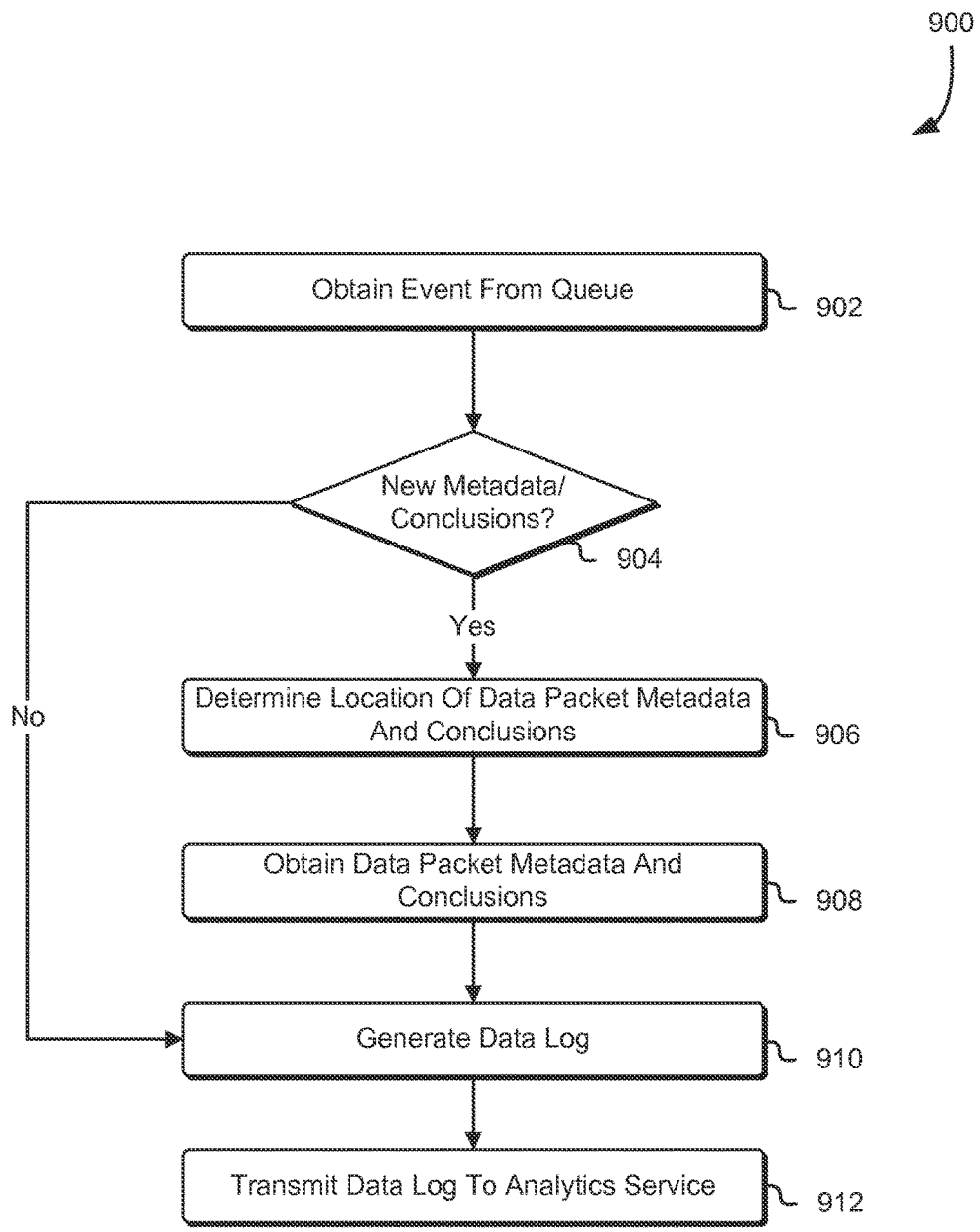
FIG. 9 shows an illustrative example of a process for obtaining one or more events from a queue to generate data logs using data packet metadata and conclusions and to publish the generated data logs to an analytics service in accordance with at least one embodiment.

As noted above, the virtual computer system service may include a data publishing sub-system, which may be an application, programming code installed on a computer system of the virtual computer system service, or one or more computer systems of the virtual computer system service configured to obtain data segments from the data logs repository, aggregate and convert these data segments into one or more data logs, and transmit these data logs to an analytics service of the computing resource service provider. The analytics service may enable customers of the computing resource service provider to access their requested network traffic information for their various computing resources. Accordingly, FIG. 9 shows an illustrative example of a process 900 for obtaining one or more events from a queue to generate data logs using network information and to publish the generated data logs to an analytics service in accordance with at least one embodiment. The process 900 may be performed by the aforementioned data publishing sub-system.

The data publishing sub-system may be configured to access a managed queuing service to determine whether there is a new event published to a queue. The data publishing sub-system may periodically access this service to obtain 902 any new events from a particular queue that is configured to queue events corresponding to the creation and storage of new data segments in the data logs repository. Alternatively, the data publishing sub-system may receive a notification from the managed queuing service indicating that a new event has been added to the queue.

The data publishing sub-system may evaluate any new events from the managed queuing service to determine 904 whether these events specify any new data segments (e.g., compiled metadata and conclusions) that may be used to generate one or more data logs for transmittal to the analytics service. For example, if the new event from the queue specifies one or more data segments that have been previously obtained by the data publishing sub-system, the data publishing sub-system may utilize these previously obtained data segments to generate 910 the one or more data logs that are to be transmitted to the analytics service. However, if the obtained event specifies that there are new data segments within the data logs repository, the data publishing sub-system may obtain the notification from the managed queuing service to determine 906 where within the data logs repository the newly created data segments are stored.

In response to this determination, the data publishing sub-system may access the data logs repository to obtain 908 the identified one or more data segments. The data publishing sub-system may utilize these one or more data segments from the data logs repository to generate 910 the one or more data logs to be transmitted to the analytics service. For instance, the data publishing sub-system may evaluate the obtained data segments to identify the one or more types of conclusions recorded within the data segments. Further, the data publishing sub-system may parse the obtained data segments based at least in part on the time intervals during which the metadata specified within the data segments was collected. For instance, each data log that is to be generated may correspond to particular time intervals that differ from those of the data segments from the data logs repository. If so, the data publishing sub-system may aggregate the metadata and conclusions in the data segments in a manner such that the metadata and corresponding conclusions per data log correspond to the appropriate time interval for the data log. In some embodiments, the data logs have a particular format in which they are to be created that differs from the format of the one or more data segments. Thus, the data publishing sub-system may convert the information from the data segments into a proper format for the data logs when generating the new data logs.

Once the data publishing sub-system has generated the new data logs, the data publishing sub-system may transmit 912 these data logs to the analytics service. For instance, the data publishing sub-system may access a published data logs repository of the analytics service to store the data logs within the repository. Further, the data publishing sub-system may transmit a notification to the analytics service to indicate the parameters of the stored data logs, as well as the storage location of the data logs within the published data logs repository. In some embodiments, the data publishing sub-system transmits the data logs to the analytics service whereby the analytics service will analyze the data logs to identify the information specified within the data logs and store the data logs within the published data logs repository. The analytics service may utilize the information from the data logs to update the user profiles of any customers associated with the computing resources for which the information was collected by the physical host agent described above.

Figure 10:
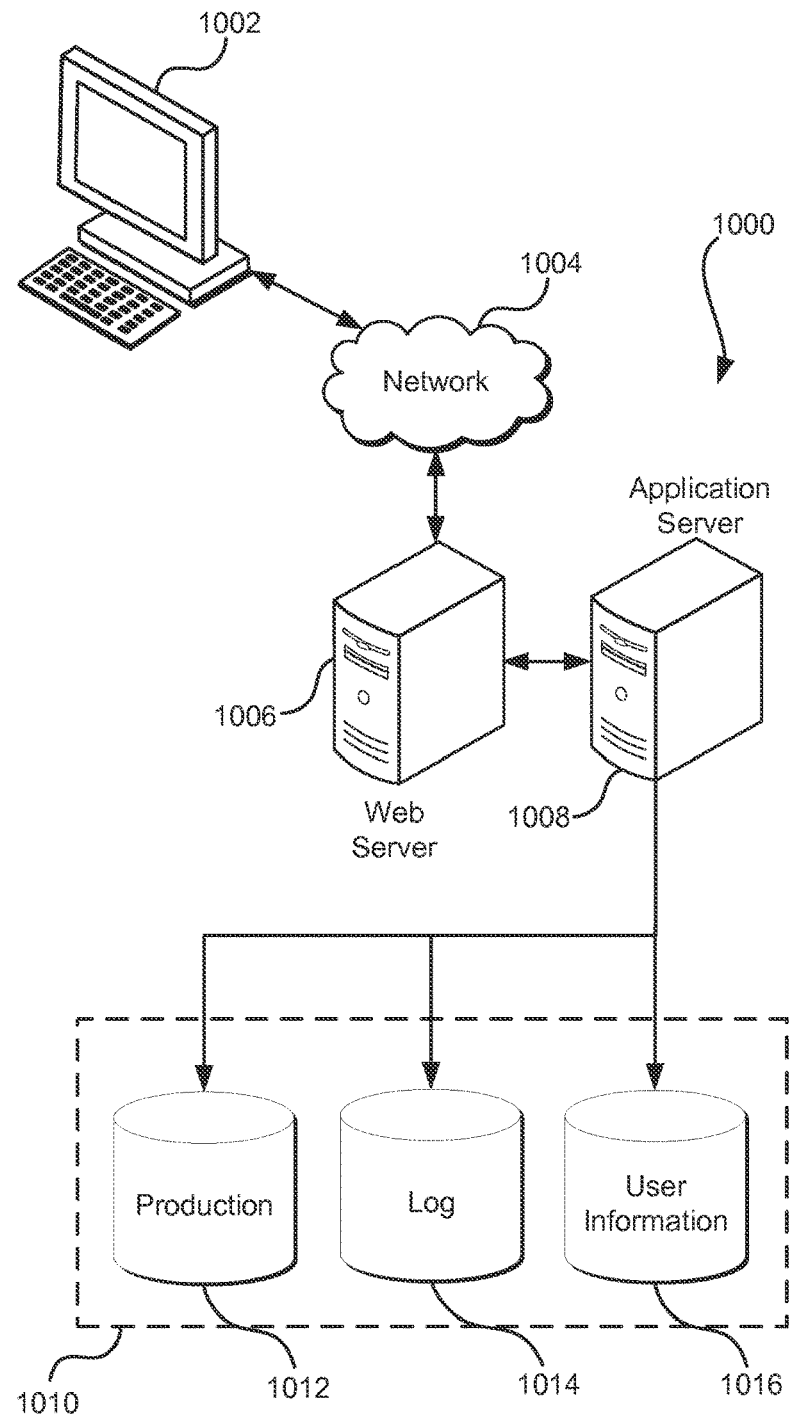
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A non-transitory computer-readable storage medium having stored thereon executable instructions that, when executed by one or more processors of a computer system, cause the computer system to at least:
   obtain, in response to a request to obtain one or more conclusions regarding aggregate network traffic of users of a computing resource, configuration information for extracting data packet metadata from incoming data packets and outgoing data packets for the computing resource;
   on a physical host running a virtual machine identified in the request to determine one or more conclusions, extract the data packet metadata from the incoming data packets and the outgoing data packets, wherein the data packet metadata that is extracted from the incoming data packets and outgoing data packets is limited based at least in part on the one or more conclusions;
   analyze the data packet metadata to determine the one or more conclusions regarding the aggregate network traffic of the users of the computing resource; and
   store the data packet metadata and the one or more conclusions.

2. The non-transitory computer-readable storage medium of claim 1, wherein the instructions further cause the computer system to:
   compile the one or more data segments into one or more data logs usable by an analytics service to provide the one or more conclusions in response to requests to obtain the one or more conclusions for the computing resource.

3. The non-transitory computer-readable storage medium of claim 2, wherein the instructions further cause the computer system to:
   store the data packet metadata and the one or more conclusions in a buffer within a kernel-space of an initial domain created by a hypervisor; and
   compile the data packet metadata and the one or more conclusions from the buffer within a user-space of the initial domain created by the hypervisor to aggregate the data packet metadata and the one or more conclusions into the one or more data segments.

4. The non-transitory computer-readable storage medium of claim 1, wherein the instructions further cause the computer system to utilize a state machine to evaluate the data packet metadata to identify a state for a computing device associated with the incoming data packets and the outgoing data packets, the state indicative of an operating system of the computing device.

5. The non-transitory computer-readable storage medium of claim 1, wherein the instructions further cause the computer system to:
   evaluate one or more Transport Control Protocol sequence numbers for the incoming data packets and the outgoing data packets; and
   determine the one or more conclusions based at least in part on the evaluation of the one or more Transport Control Protocol sequence numbers.

6. The non-transitory computer-readable storage medium of claim 1, wherein the instructions further cause the computer system to:
   evaluate Secure Shell protocol entries for the incoming data packets and the outgoing data packets; and
   determine the one or more conclusions based at least in part on the evaluation of the Secure Shell protocol entries.

7. The non-transitory computer-readable storage medium of claim 1, wherein the one or more conclusions specify whether any of the incoming data packets and the outgoing data packets are encrypted.

8. The non-transitory computer-readable storage medium of claim 1, wherein the instructions further cause the computer system to transmit the data packet metadata and the one or more conclusions to a security system to determine whether there is an indication of a security issue based at least in part on the one or more conclusions.

9. A system, comprising:
   one or more processors; and
   memory including instructions that, when executed by the one or more processors, cause the system to at least:
      receive, to a physical host running a virtual machine identified in a request to monitor network traffic, configuration information specifying data packet metadata to be extracted from incoming data packets and from outgoing data packets over a network and one or more algorithms for determining one or more conclusions about aggregate network traffic of users of the virtual machine based at least in part on the data packet metadata;
      identify, from the incoming data packets and from the outgoing data packets, the data packet metadata;
      extract the data packet metadata, wherein the data packet metadata that is extracted is limited based at least in part on the one or more conclusions;
      utilize the data packet metadata as input into the one or more algorithms to determine the one or more conclusions; and
      store the data packet metadata and the one or more conclusions.

10. The system of claim 9, wherein the instructions further cause the system to:
    aggregate the data packet metadata and the one or more conclusions about the aggregate network traffic of the users of the virtual machine into one or more data logs specific to a computing resource and to a characteristic of the data packet metadata extracted from the incoming data packets and the outgoing data packets; and
    store the one or more data logs in a repository of an analytics service to enable access to the one or more data logs.

11. The system of claim 9, wherein the instructions further cause the system to:
    utilize the one or more algorithms to evaluate one or more Transport Control Protocol sequence numbers for the incoming data packets and the outgoing data packets to determine whether there is a retransmission of data through the network, a gap in the incoming data packets, missing data packets, or data packets arriving out of order; and
    generate the one or more conclusions based at least in part on the evaluation of the one or more Transport Control Protocol sequence numbers.

12. The system of claim 9, wherein the configuration information is received through a component of the system operating within a kernel-space of an initial domain created by a hypervisor.

13. The system of claim 9, wherein the instructions further cause the system to:
    determine, based at least in part on the one or more conclusions, whether there is an indication of a security issue; and
    as a result of presence of the indication of the security issue, transmit the data packet metadata and the one or more conclusions to a security system for creation of one or more network alarms.

14. The system of claim 9, wherein the instructions further cause the system to:
utilize a state machine to evaluate the data packet metadata to identify a state for a computing device associated with the incoming data packets and the outgoing data packets; and
identify, based at least in part on the state for the computing device, an operating system of the computing device.

15. The system of claim 9, wherein:
the configuration information identifies virtual machine instances to be monitored; and
the instructions further cause the system to monitor the incoming data packets and the outgoing data packets for the virtual machine instances.

16. The system of claim 9, wherein the one or more conclusions specify a classification of the data packet metadata, the classification specifying whether the data packet metadata corresponds to encrypted or unencrypted information.

17. A computer-implemented method, comprising:
receiving a request to monitor network traffic of a virtual machine instance to determine one or more conclusions about aggregate network traffic of users of the virtual machine instance, the request specifying an identifier of the virtual machine instance;
using the identifier of the virtual machine instance to identify a physical host from a plurality of physical hosts, the physical host utilized to instantiate the virtual machine instance;
configuring a physical host agent of the physical host to monitor the network traffic of the virtual machine instance to extract data packet metadata from data packets originating from the virtual machine instance and from data packets destined for the virtual machine instance, wherein the data packet metadata that is extracted from the data packets is limited based at least in part on the one or more conclusions to be determined of the request;
utilizing, by the physical host agent, one or more algorithms to analyze the data packet metadata to determine the one or more conclusions about the aggregate network traffic of the users of the virtual machine instance; and
storing, by the physical host agent, the data packet metadata and the one or more conclusions.

18. The computer-implemented method of claim 17, further comprising:
compiling the data packet metadata and the one or more conclusions into one or more data segments;
aggregating the one or more data segments into one or more data logs for storage within a repository of an analytics service; and
storing the one or more data logs within the repository of the analytics service to enable the one or more data logs to be accessed to obtain the one or more conclusions and the data packet metadata.

19. The computer-implemented method of claim 17, wherein the physical host agent of the physical host includes one or more components operating within a kernel-space of an initial domain created by a hypervisor of the physical host.

20. The computer-implemented method of claim 17, further comprising:
providing the data packet metadata in a human interface for user determination of the one or more conclusions; and
updating the one or more algorithms based at least in part on the user determination.

\* \* \* \* \*